Nov. 14, 1933.   J. McK. COYNER   1,935,144
CALF FEEDING HALTER
Filed Feb. 13, 1933
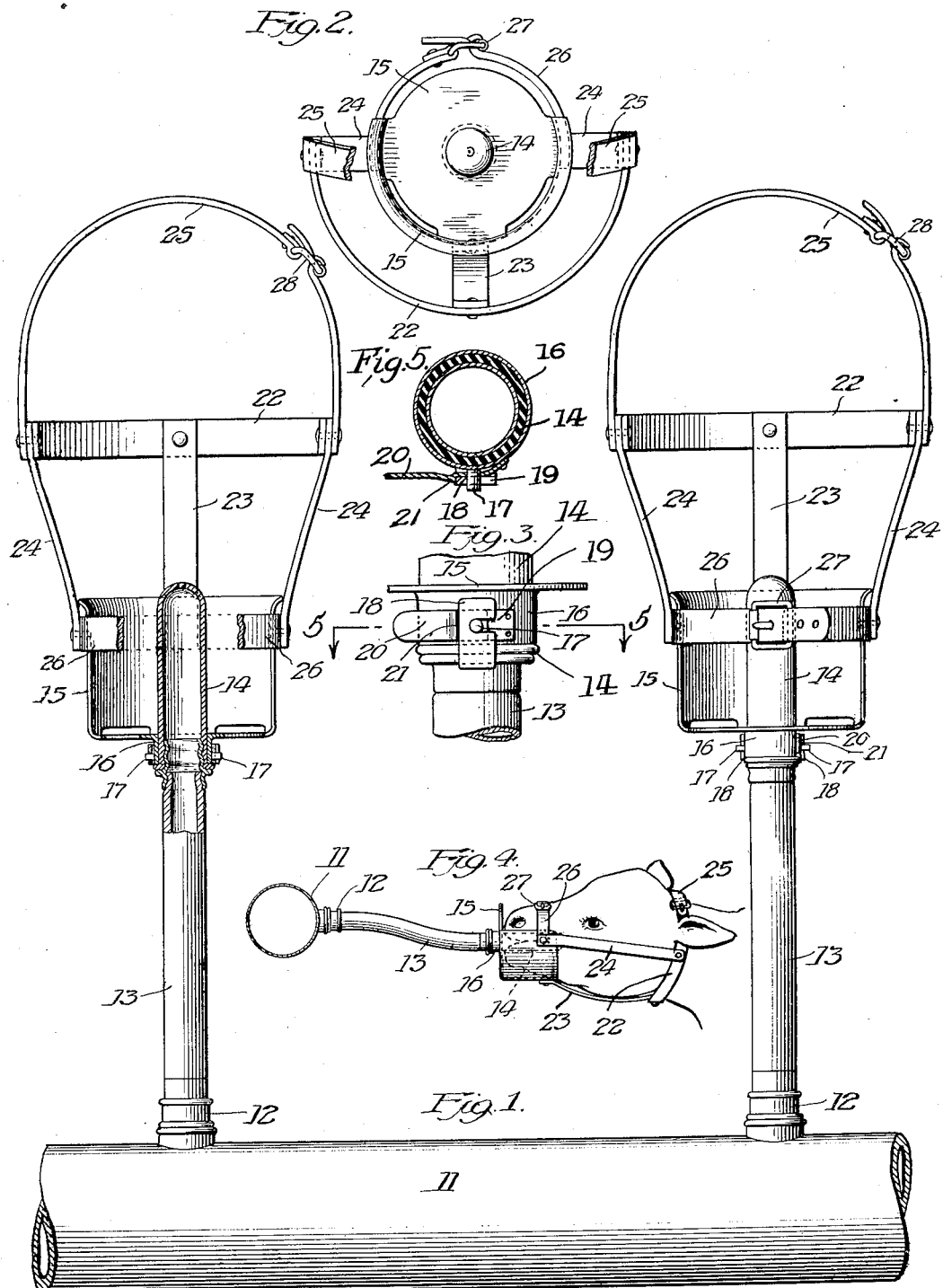

Patented Nov. 14, 1933

1,935,144

UNITED STATES PATENT OFFICE 1,935,144

CALF FEEDING HALTER

James McKee Coyner, Madison, Wis.

Application February 13, 1933. Serial No. 656,548

4 Claims. (Cl. 119—71)

The present invention is concerned with the suckling of calves and other young animals which have been taken from their mothers.

Dairymen find it important to the profitable operation of their industry that as soon as practicable after birth the calf be fed independent of the mother in order that the cow's milk supply be made available for the production of cream and butter for the market. The young calf must be weaned and taught to drink whole milk or skim milk fortified by the addition of a suitable fat or artificially suckled upon such milk.

The weaning of calves and teaching them to drink milk involves considerable trouble and moreover the veal resulting from calves thus fed lacks in firmness and fatness of flesh and desirable color and the calf itself tends to a "pot-bellied" condition due to the premature functioning of the first two compartments of the stomach which are normally inoperative in the nursing calf; whereas if the calf is suckled, its digestive organs function in the normal way, the milk by-passing the first two compartments and entering directly those compartments where it is subjected to the action of the rennin. Suckled calves consequently command a higher price on the market and the veal is of higher grade and commands a premium at the stock yards over that of the calf which has been taught to feed by drinking.

Pails with applied rubber nipples or teats may be used for suckling individual calves and where properly constructed such suckling devices are found to be satisfactory; but where there are a number of calves to be fed in this manner, the employment of a corresponding number of pails is troublesome and is open to the serious objection that in case a young calf is jostled away from the feeding pail and loses the nipple from its mouth, it is often unable to re-locate it as nature prompts the calf to look for a mother cow rather than a pail as a source of food supply.

A very serious problem confronts the packing houses which receive at the stock yards large numbers of young calves for slaughter, many of which have never been taught to drink. These calves, if no means be provided for suckling en route or at the stock yards, must go hungry for twelve or twenty-four or even forty-eight hours preceding slaughter. Their hunger, accompanied by constant worry and bleating, causes a dissipation of much of the accumulated kidney fat and an even more serious depreciation of the organs, which very materially reduces the grade of veal with resultant loss in profit.

Having these considerations in mind, my invention proposes to supply to the dairy farmer and to the transportation companies and to the stock yards means whereby a group of young calves may be suckled at proper intervals with a predetermined amount of food, such embodying the provision of means for maintaining the calf in feeding position and in operative connection with its individual milk supply nipple. Details of the preferred form of the invention are set forth in the following description and in the accompanying drawing by way of illustration.

In the drawing,

Fig. 1 represents in plan a feed reservoir manifold with two halter devices, one partly in horizontal section;

Fig. 2 is an end view through one of the halters shown in Fig. 1;

Fig. 3 is a detail of the releasable connection between a halter and its connecting tube;

Fig. 4 is a schematic fragmentary view of a feeding calf; and

Fig. 5 is a section on the line 5—5 of Fig. 3.

Having reference to the drawing as exemplifying the invention, there is illustrated at 11 a fluid feed reservoir for containing milk or the like. This reservoir may be in the shape of a trough or other suitable form but is here shown as a tubular manifold having a plurality of outlets at 12 connected with tubes 13, each of which terminates in a teat or nipple 14. The tube 13 comprises preferably a short length of rubber hose and the connection at 12 may be an ordinary hose coupling. The nipple 14 is advantageously made of soft elastic rubber simulating in shape and size the cow's teat, the open end of the nipple being provided with a marginal bead and adapted to be stretched over and to embrace the terminal end of the tube 13.

A cup-like nose piece 15 of metal or other suitable material is provided in its closed end with a centrally disposed integral collar 16 adapted to be slipped over the base of the nipple outwardly of the bead and to clamp the same upon the end of the tube. The nose piece 15 by means of the collar 16 is releasably but securely attached to the end of the hose by means of diametrically arranged studs 17 adapted to be rotatively engaged with ears 18 affixed to the tube end and provided with diametrically disposed open slots 19. A leaf spring 20 shouldered at 21 and fixed to the collar 16 holds the studs firmly in engagement with the slot, the engagement being releasable by pressing upon the spring 20 to release one of the ears 18 from the shoulder 20.

The nose piece 15 is a constituent part of an ordinary halter construction comprising the throat strap 22, a jaw strap 23, cheek straps 24, a strap 25 for passing over the neck back of the ears, and a nose strap 26. The nose strap and the cheek straps are provided respectively with buckles 27 and 28 by means of which they may be adjusted as to size and the latter may be wholly released to free the head of the calf from the halter. It is to be noted that the nose piece 15 forms an integral part of the halter construction and is releasably connected to the tube 13 in such relation that the nipple 14 occupies a position for engagement by the mouth of the calf when the halter is applied.

In use, there would be installed in the calf pen a food reservoir milk manifold with a number of outlets at 12 with attached halters and nipples corresponding to the number of calves desired to be fed at one time. A calf would be brought up to the feeding device and its mouth caused to engage one of the nipples, whereupon the halter would be secured, tethering the calf firmly in feeding position so that it would be prevented from losing the nipple under any circustances. After the calf had fed a predetermined length of time suited to its needs, it would be released and another calf secured by the same halter in feeding relation to the same nipple. Thus the calves can be individually fed for the proper length of time at proper intervals without interference by other calves. The device is useable on the farm and in the stockyards and also in cattle cars, the length of the connecting tubes being adapted to the conditions attendant upon feeding circumstances.

I claim:

1. In a calf feeding device, the combination with a source of liquid food supply, and a nipple in communication with the supply and adapted to enter the mouth of the calf to be fed, of means for confining the head in operative relation to the nipple.

2. In a calf feeding device, the combination with a source of milk supply, and a nipple in flexible communication with the supply and adapted to enter the mouth of the calf to be fed, of a halter for confining the head in operative relation to the nipple.

3. In a calf feeding device, the combination with a source of milk supply comprising a manifold provided with a plurality of outlet tubes, nipples forming the terminals of the tubes, of halters each including a nose piece about a nipple, and head-confining means whereby to secure and hold the animal with a nipple in its mouth.

4. In a calf feeding device, the combination with a source of milk supply comprising a manifold provided with a plurality of outlet tubes, nipples forming the terminals of the tubes, of halters each including a nose piece about a nipple, head-confining means whereby to secure and hold the animal with a nipple in its mouth, means for releasably connecting the tubes with the manifold and the halters with the tubes, and means for adjusting the size of the head-confining elements to suit different animals.

JAMES McKEE COYNER.